(12) United States Patent
Fujiwara et al.

(10) Patent No.: US 6,644,007 B2
(45) Date of Patent: Nov. 11, 2003

(54) BRAIDING YARN MADE OF EXPANDED GRAPHITE

(75) Inventors: Masaru Fujiwara, Sanda (JP); Takahisa Ueda, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 142 days.

(21) Appl. No.: 09/926,017

(22) PCT Filed: Dec. 25, 2000

(86) PCT No.: PCT/JP00/09176
§ 371 (c)(1),
(2), (4) Date: Aug. 15, 2001

(87) PCT Pub. No.: WO01/48402
PCT Pub. Date: Jul. 5, 2001

(65) Prior Publication Data
US 2003/0070413 A1 Apr. 17, 2003

(30) Foreign Application Priority Data
Dec. 27, 1999 (JP) .............................. 11-369910

(51) Int. Cl.⁷ .............................. D02G 3/02; D02G 3/22
(52) U.S. Cl. .............................. 57/210; 57/200; 277/529
(58) Field of Search .................... 57/200, 210; 277/529, 277/530, 534, 536, 537, 539

(56) References Cited

U.S. PATENT DOCUMENTS 5,225,262 A * 7/1993 Leduc ......................... 428/75
5,549,306 A * 8/1996 Ueda ........................... 277/537
5,605,341 A * 2/1997 Ueda ........................... 277/536
6,027,809 A * 2/2000 Ueda et al. .................. 428/408
6,502,382 B1 * 1/2003 Fujiwara et al. .............. 57/200
2002/0069635 A1 * 6/2002 Tsukamoto .................. 57/200

FOREIGN PATENT DOCUMENTS

JP          6-279752        10/1994

* cited by examiner

Primary Examiner—John J. Calvert
Assistant Examiner—Shaun R Hurley
(74) Attorney, Agent, or Firm—Jones, Tullar & Cooper, P.C.

(57) ABSTRACT

The present invention relates to a braiding yarn made of expanded graphite for a gland packing which is to be used in a shaft seal part of a fluid apparatus or the like. In the braiding yarn made of expanded graphite of the invention, an expanded graphite tape of a predetermined width is folded into a valley fold in the longitudinal direction, both end portions in the width direction of the expanded graphite tape are bent so as to be directed toward the inner side of the width direction of the expanded graphite tape, and the outer periphery of the tape is covered by a reinforcing member configured by a braided body of stainless steel wires. The expanded graphite tape may be twisted. Reinforcing fibers may be embedded in the expanded graphite tape. Part of expanded graphite particles on the side of the surface of the expanded graphite tape may be removed away. According to the expanded graphite tape of the invention, flaking of expanded graphite particles during a braiding process is reduced or prevented from occurring, and the pressure resistance of a gland packing can be enhanced.

7 Claims, 7 Drawing Sheets

BRAIDING YARN MADE OF EXPANDED GRAPHITE

TECHNICAL FIELD

The present invention relates to a braiding yarn made of expanded graphite for a gland packing which is to be used in a shaft seal part of a fluid apparatus or the like, and more particularly to a braiding yarn made of expanded graphite which can enhance the pressure resistance of a gland packing.

BACKGROUND ART

Figure 8:
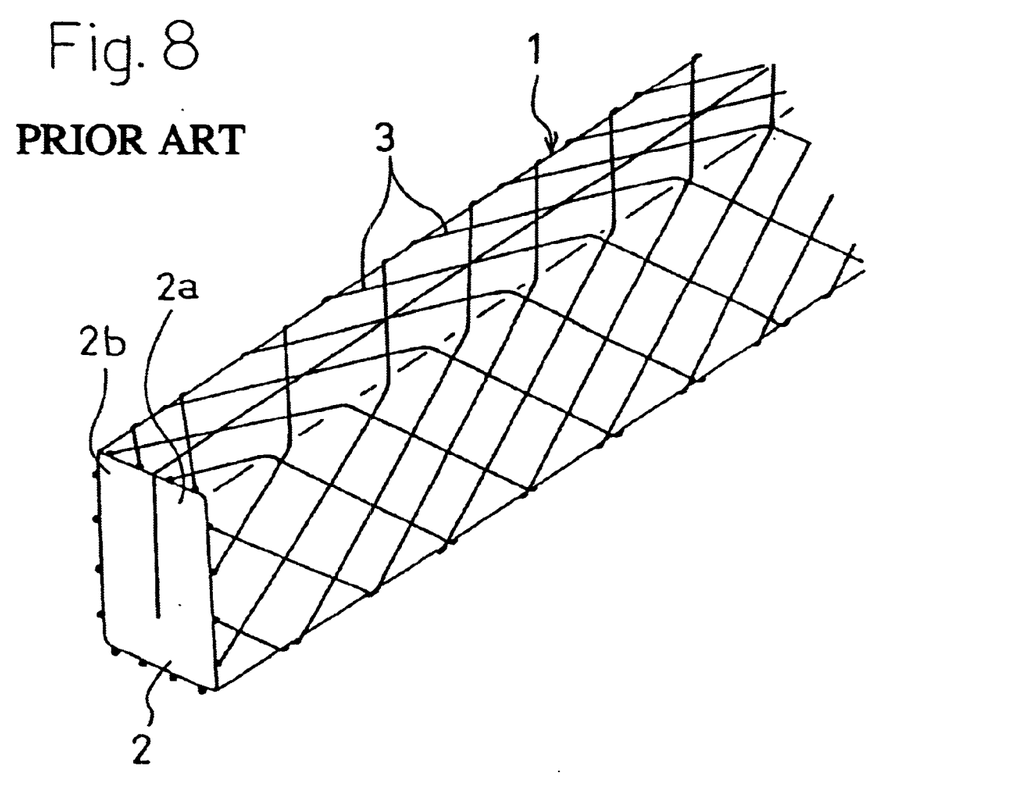
FIG. 8 is a perspective view showing an example of a conventional braiding yarn made of expanded graphite.

Conventionally, as a braiding yarn for a gland packing which is to be used in a shaft seal part of a fluid apparatus or the like, known is, for example, a braiding yarn 1 shown in FIG. 8. In the braiding yarn 1, an expanded graphite tape 2 of a predetermined width is folded into a valley fold in the longitudinal direction, and the outer periphery of the tape is covered by a reinforcing member 3 configured by a braided body of a metal wire.

A gland packing is produced by bundling and braiding a plurality of the braiding yarns 1. However, the expanded graphite tape 2 is low in tensile strength and brittle, and edges of both end portions 2a, 2b in the width direction have low flaking resistance among expanded graphite particles. In edges of both end portions 2a, 2b in the width direction, namely, expanded graphite particles easily flake off. In the case where, during a braiding process, large tensile and sharing forces act on the edges of both end portions 2a, 2b in the width direction, therefore, cracks are formed with starting from the edges of both the end portions 2a, 2b in the width direction, and expanded graphite particles in and in the vicinity of the edges of both the end portions 2a, 2b in the width direction flake off. When a plurality of braiding yarns are to be braided, consequently, a large tensile force cannot be applied to the braiding yarns, so that the tensile force of the braiding yarns is limited to a low level. As a result, the pressure resistance of a gland packing cannot be enhanced.

SUMMARY OF THE INVENTION

It is an object of the invention to provide a braiding yarn made of expanded graphite in which flaking of expanded graphite particles during a braiding process is reduced or prevented from occurring, and the pressure resistance of a gland packing can be enhanced.

In order to attain the object, the braiding yarn made of expanded graphite according to the invention is characterized in that, in a braiding yarn made of expanded graphite which is to be used in a gland packing, an outer periphery of a bent expanded graphite tape is covered by a reinforcing member configured by a knitted body or a braided body, and at least one end portion in a width direction of the expanded graphite tape is bent to be directed toward an inner side in the width direction of the braiding yarn.

Furthermore, the braiding yarn made of expanded graphite according to the invention is characterized in that, in a braiding yarn made of expanded graphite which is to be used in a gland packing, an outer periphery of a twisted expanded graphite tape is covered by a reinforcing member configured by a knitted body or a braided body, and at least one end portion in a width direction of the expanded graphite tape is bent to be directed toward an inner side in the width direction of the braiding yarn.

According to the inventions, it is a matter of course that cutting of the bent or twisted expanded graphite tape which may be caused by a tensile or twisting force during a braiding process is effectively prevented from occurring by the reinforcing member covering the outer periphery of the tape. Since at least one end portion in the width direction of the expanded graphite tape is bent to be directed toward the inner side in the width direction, moreover, large tensile and sharing forces do not directly act on the edges of the one end portion during a braiding process, and hence occurrence of cracks from the edges of the one end portion and flaking of expanded graphite particles due to the occurrence of cracks can be reduced. As a result, braiding at a larger tensile force is enabled, and the pressure resistance of a gland packing can be enhanced.

Furthermore, the braiding yarn made of expanded graphite according to the invention is characterized in that reinforcing fibers are embedded in the expanded graphite tape. According to the invention, since reinforcing fibers are embedded in the expanded graphite tape, the tensile and twisting forces of the expanded graphite tape can be improved.

Furthermore, the braiding yarn made of expanded graphite according to the invention is characterized in that part of expanded graphite particles on a side of a surface of the expanded graphite tape are removed away. According to the invention, part of expanded graphite particles which are on the side of the surface of the expanded graphite tape, and which are highly oriented at a high density where cracks easily occur are removed away by a blasting process. During a braiding process, even when a large tensile force acts on the expanded graphite tape, therefore, occurrence of cracks and flaking of expanded graphite particles due to the occurrence of cracks can be reduced more surely.

DESCRIPTION OF THE PREFERRED EMBODIMENTS

Hereinafter, preferred embodiments of the invention will be described with reference to the drawings.

Figure 1:
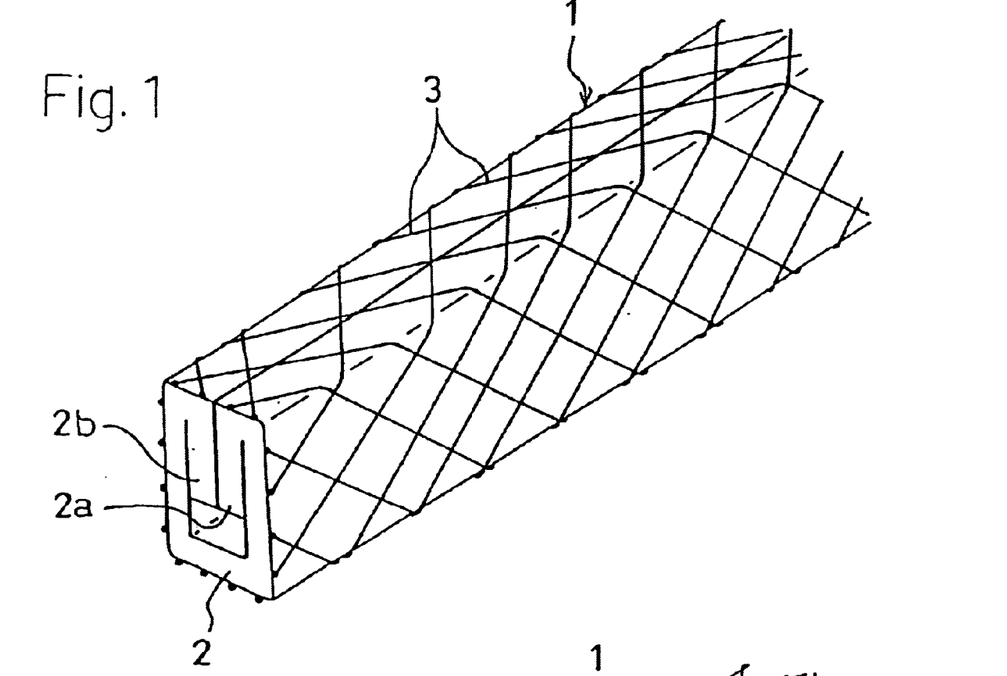
FIG. 1 is a perspective view showing an embodiment of the invention.

FIG. 1 is a perspective view showing an embodiment of the braiding yarn made of expanded graphite of the invention. Referring to FIG. 1, in the braiding yarn 1 made of expanded graphite, an expanded graphite tape 2 of a predetermined width is folded into a valley fold in the longitudinal direction, end portions 2a, 2b in the width direction of the expanded graphite tape 2 are bent so as to be directed toward the inner side of the width direction of the expanded graphite tape 2, and the outer periphery of the tape is covered by a reinforcing member 3 configured by a braided body of stainless steel wires.

Figure 2:
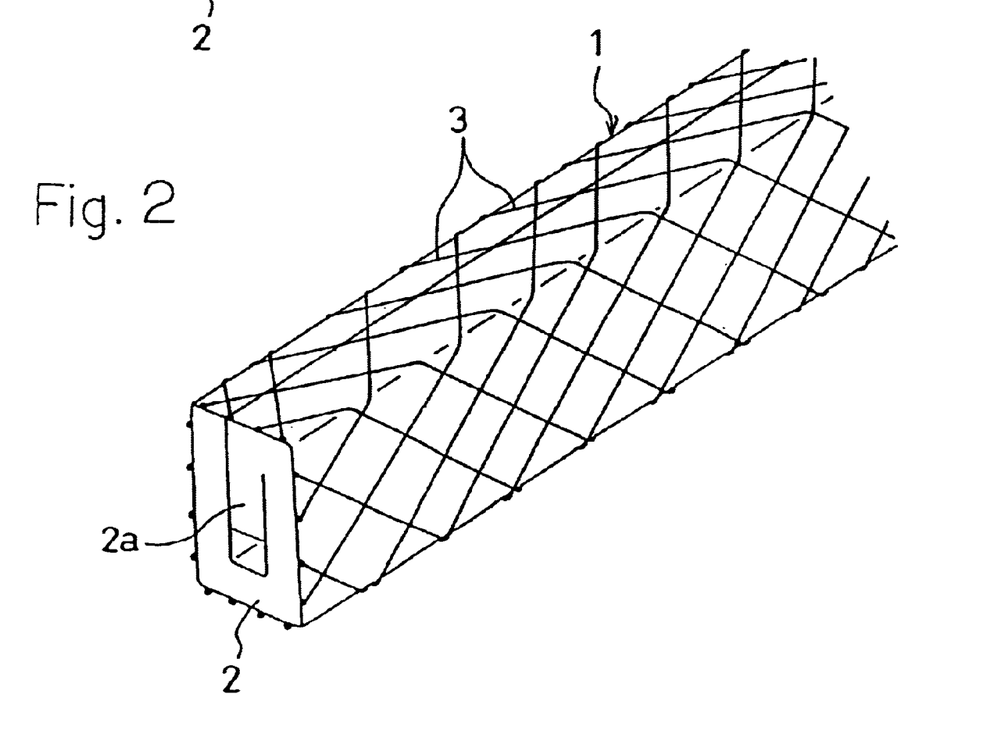
FIG. 2 is a perspective view showing another embodiment of the invention.

FIG. 2 is a perspective view showing another embodiment of the braiding yarn made of expanded graphite of the invention. Referring to FIG. 1, in the braiding yarn 1 made of expanded graphite, an expanded graphite tape 2 of a predetermined width is folded into a valley fold in the longitudinal direction, only one end portion 2a in the width direction of the expanded graphite tape 2 is bent so as to be directed toward the inner side of the width direction of the expanded graphite tape 2, and the outer periphery of the tape is covered by a reinforcing member 3 configured by a braided body of stainless steel wires.

The bending in the longitudinal direction of the expanded graphite tape 2, and that of at least the one end portion 2a toward the inner side in the width direction of the expanded graphite tape 2 are required to be realized at least during the braiding process. Before the braiding process, therefore, the expanded graphite tape 2 may be previously bent, for example, into a V-like shape, and the one end portion 2a may be slightly bent toward the inner side of the width direction of the expanded graphite tape 2. During the braiding process, the expanded graphite tape 2 and the one end portion 2a may be completely bent. The bent shape of the one end portion 2a may be a curled shape, a spiral shape, a U-like shape, or another shape.

Figure 3A:
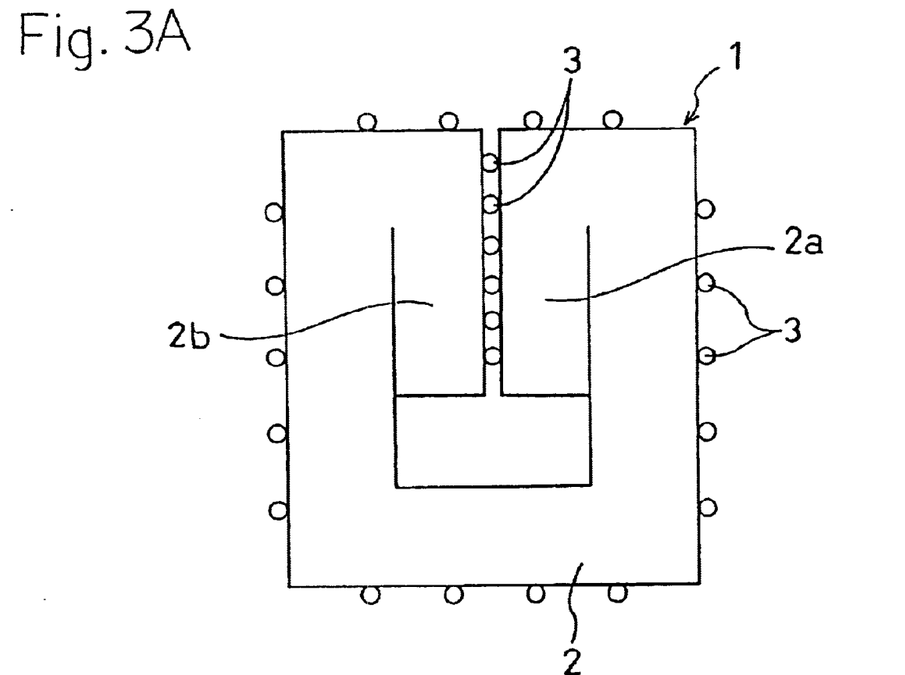
FIG. 3A is an enlarged section view showing a further embodiment of the invention.
Figure 3B:
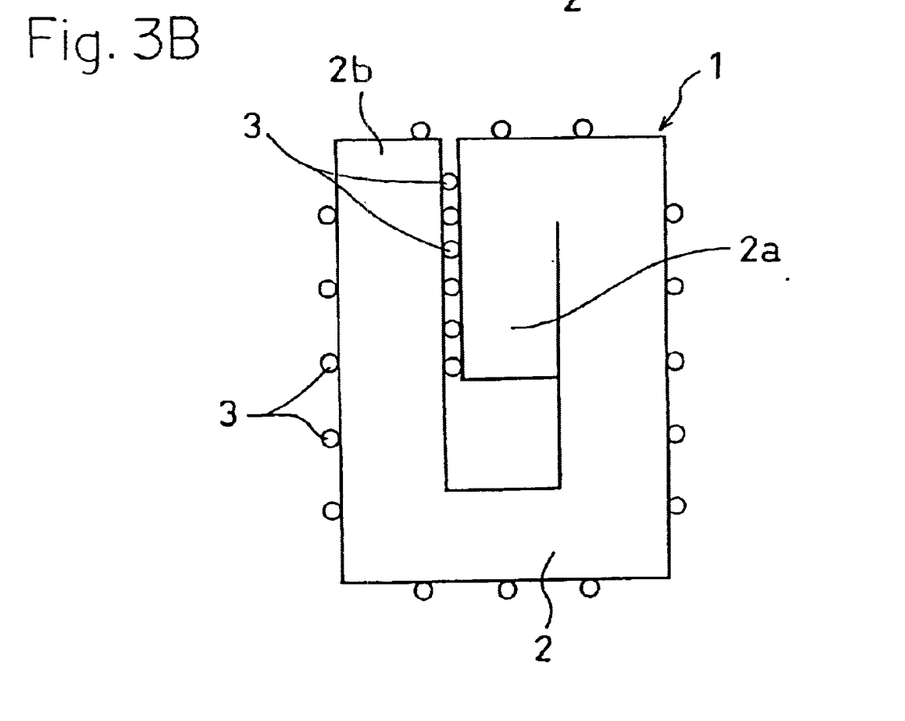
FIG. 3B is an enlarged section view showing a still further embodiment of the invention.

As the manner of covering the outer periphery of the expanded graphite tape 2 by the reinforcing member 3 configured by the braided body of stainless steel wires, in place of the illustrated example, a structure may be employed in which, as shown in FIG. 3A and FIG. 3B, part of the reinforcing member 3 is interposed between both the end portions 2a, 2b in the width direction of the expanded graphite tape 2.

The invention is not restricted to the case of the single expanded graphite tape 2. Alternatively, a plurality of expanded graphite tapes 2 may be stacked together and then bent so that at least one end portion 2a in the width direction of each of the expanded graphite tapes 2 is directed toward the inner side in the width direction of the expanded graphite tape 2.

Figure 4:
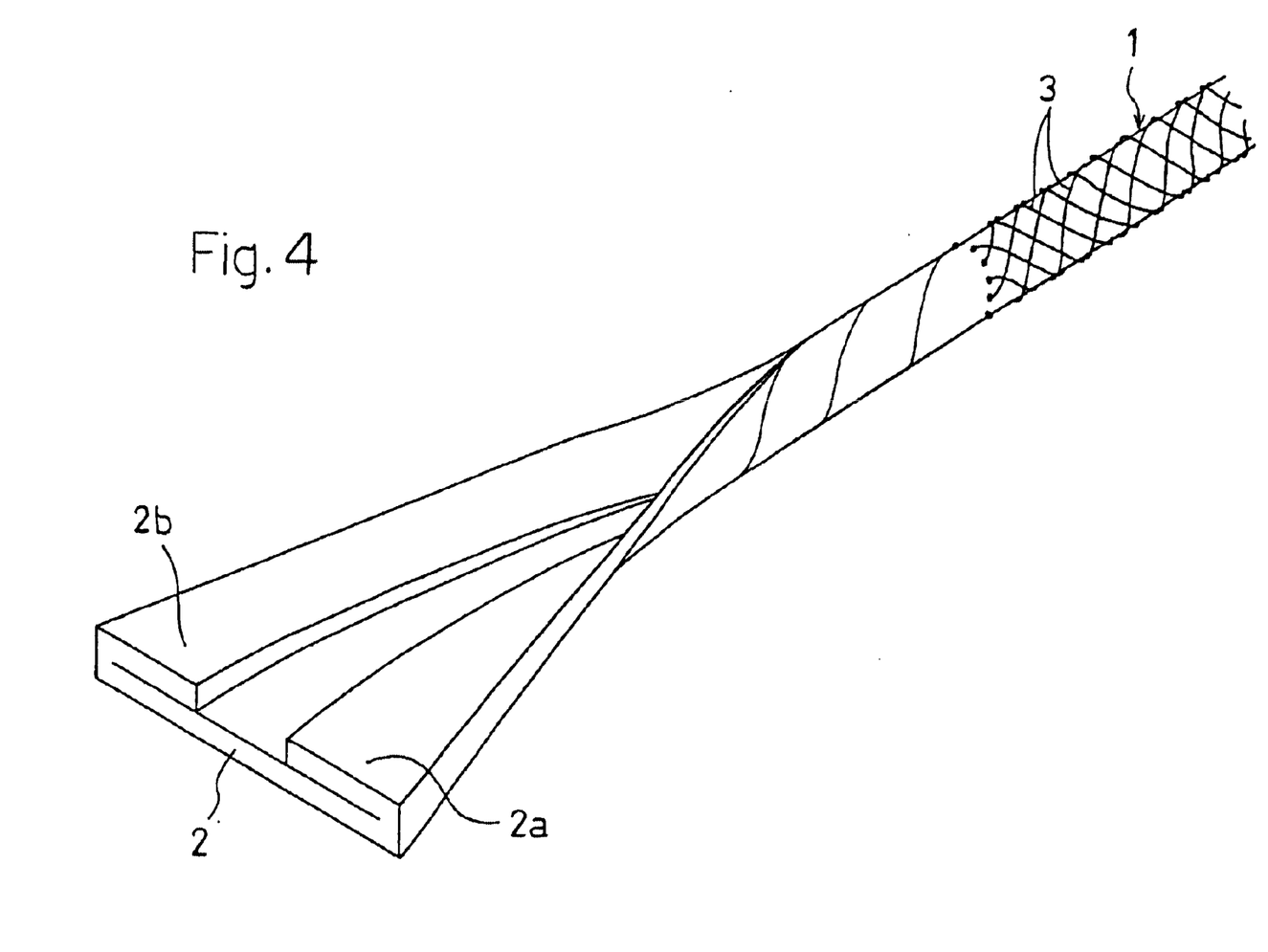
FIG. 4 is a perspective view showing a still further embodiment of the invention.

FIG. 4 is a perspective view showing a still further embodiment of the braiding yarn made of expanded graphite of the invention. Referring to FIG. 4, in the braiding yarn 1 made of expanded graphite, both end portions 2a, 2b in the width direction of an expanded graphite tape 2 of a predetermined width are bent so as to be directed toward the inner side of the width direction of the expanded graphite tape 2, the tape is twisted, and the outer periphery of the tape is covered by a reinforcing member 3 configured by a braided body of stainless steel wires.

Figure 5:
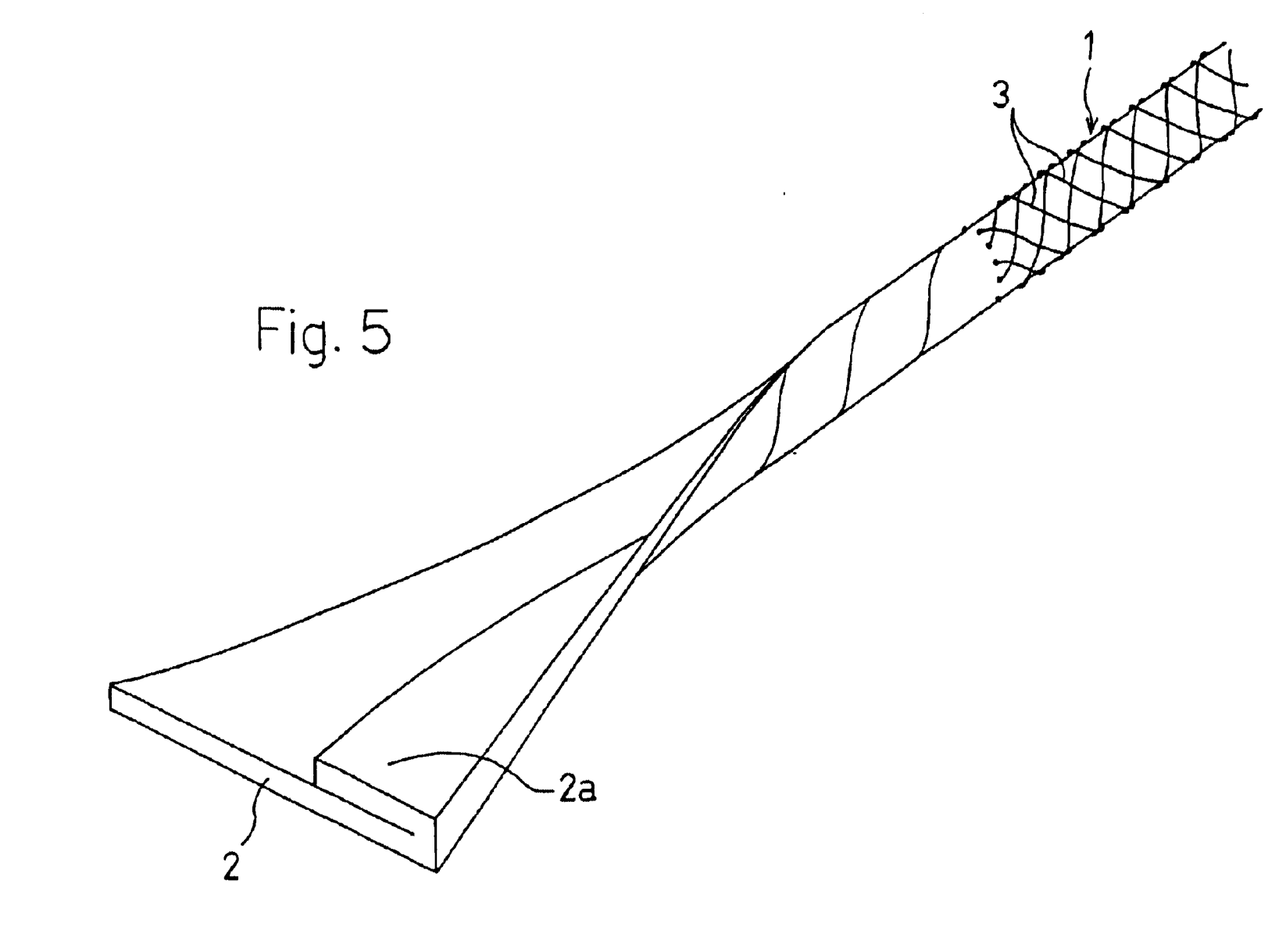
FIG. 5 is a perspective view showing a still further embodiment of the invention.
Figures 6A, 6B, 6C, 6D:
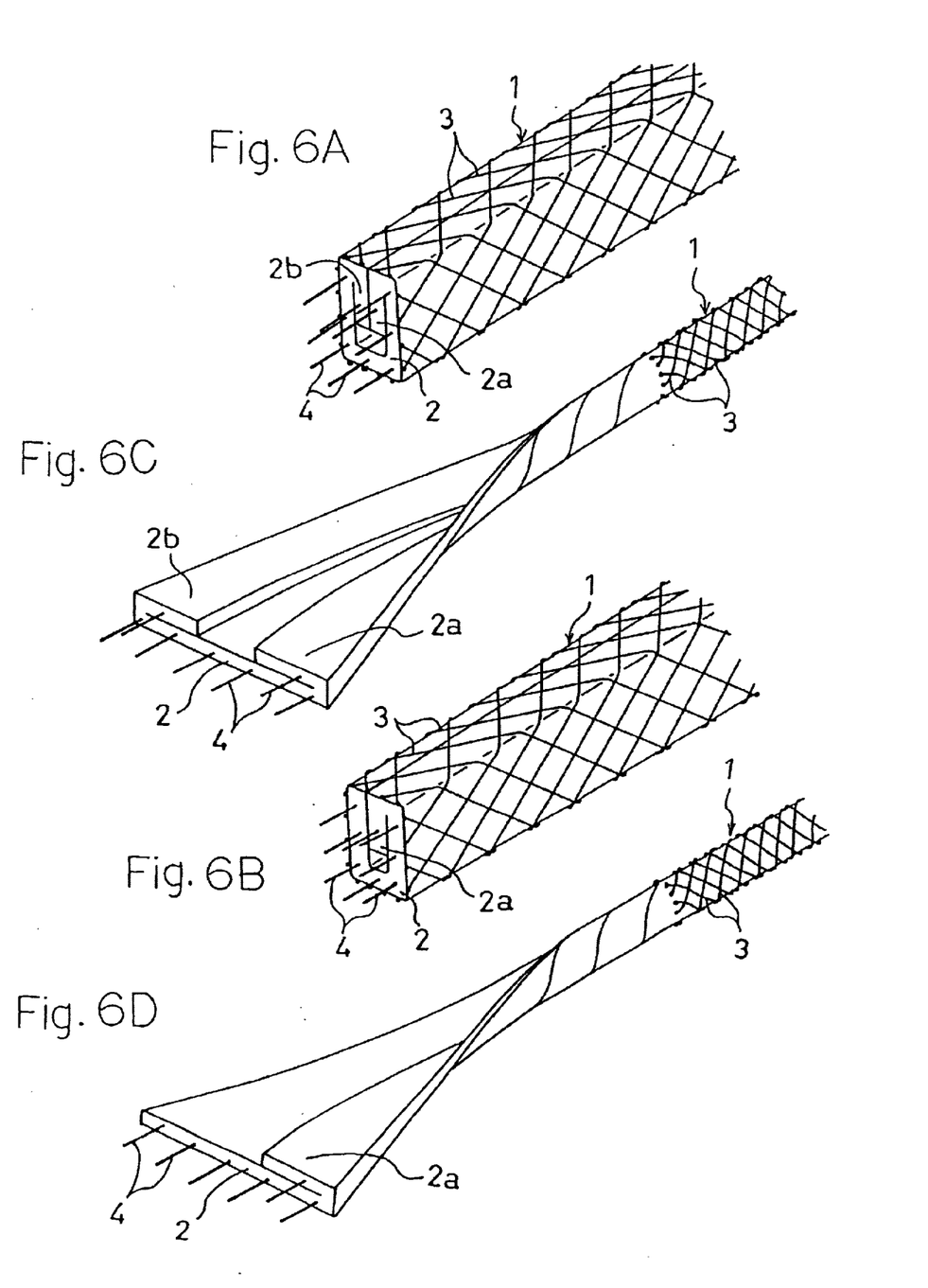
FIG. 6A is a perspective view showing a still further embodiment of the invention.
FIG. 6B is a perspective view showing a still further embodiment of the invention.
FIG. 6C is a perspective view showing a still further embodiment of the invention.
FIG. 6D is a perspective view showing a still further embodiment of the invention.
Figures 7A, 7B, 7C, 7D:
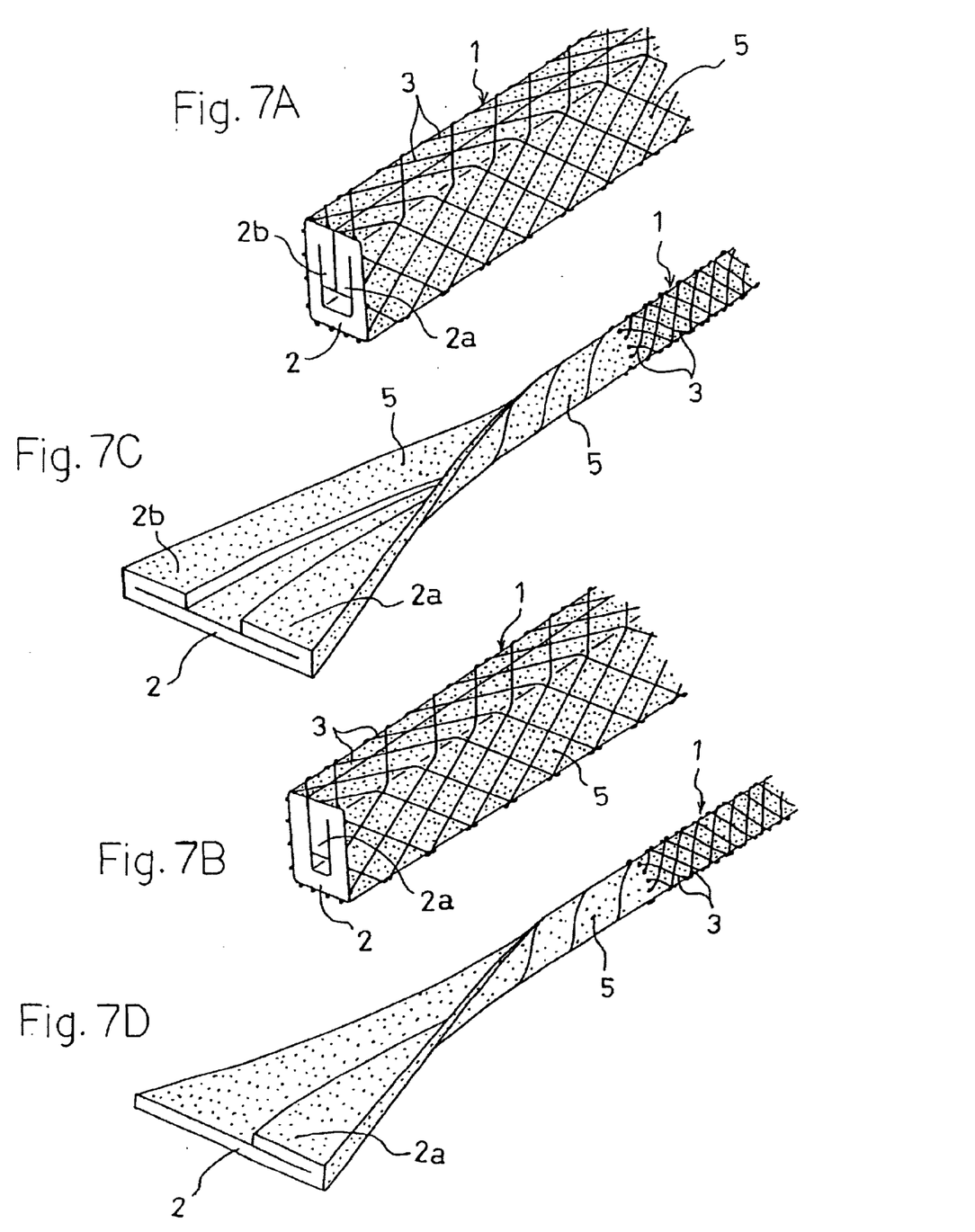
FIG. 7A is a perspective view showing a still further embodiment of the invention.
FIG. 7B is a perspective view showing a still further embodiment of the invention.
FIG. 7C is a perspective view showing a still further embodiment of the invention.
FIG. 7D is a perspective view showing a still further embodiment of the invention.

FIG. 5 is a perspective view showing a still further embodiment of the braiding yarn made of expanded graphite of the invention. Referring to FIG. 5, in the braiding yarn 1 made of expanded graphite, only one end portion 2a in the width direction of an expanded graphite tape 2 of a predetermined width is bent so as to be directed toward the inner side of the width direction of the expanded graphite tape 2, the tape is twisted, and the outer periphery of the tape is covered by a reinforcing member 3 configured by a braided body of stainless steel wires.

The bending of at least one end portion 2a toward the inner side in the width direction of the expanded graphite tape 2 is required to be realized at least during the braiding process. Before or during the twisting process, therefore, the one end portion 2a may be previously slightly bent toward the inner side of the width direction of the expanded graphite tape 2, and, during the braiding process, the one end portion 2a may be completely bent. The bent shape of the one end portion 2a may be a curled shape, a spiral shape, a U-like shape, or another shape.

The invention is not restricted to the case of the single expanded graphite tape 2. Alternatively, a plurality of expanded graphite tapes 2 may be stacked together and then twisted so that at least one end portion 2a in the width direction of each of the expanded graphite tapes 2 is directed toward the inner side in the width direction of the expanded graphite tape 2.

As the material of the reinforcing member 3, in addition to stainless wires used in the embodiments described above, metal wires such as inconel, and monel, organic fibers such as cotton, rayon, phenol, aramid, PBO, PBI, PTFE, PPS, and PEEK, and inorganic fibers such as carbon fiber, and ceramic fiber are useful. The reinforcing member 3 may be braided by means of knitting.

FIGS. 6A to 6D are perspective views showing a still further embodiment of the braiding yarn made of expanded graphite of the invention. The figures are different from the embodiments which have been described with reference to FIGS. 1 to 5, in that a plurality of reinforcing fibers 4 are embedded in the longitudinal direction in the expanded graphite tape 2 with forming gaps in the width direction.

As the reinforcing fibers 4, used is one selected from organic fibers such as cotton, rayon, phenol, aramid, PBO, PBI, PTFE, PPS, and PEEK; one selected from inorganic fibers such as glass fiber, carbon fiber, and ceramic fiber; or one selected from metal wires such as stainless steel, inconel, and monel Of course, the organic fibers, the inorganic fibers, and the metal wires may be adequately selected to be combinedly used.

FIGS. 7A to 7D are perspective views showing a still further embodiment of the braiding yarn made of expanded graphite of the invention. The figures are different from the embodiments which have been described with reference to FIGS. 1 to 5, in that part of expanded graphite particles which are on the side of the surface of the expanded graphite tape 2, and which are highly oriented at a high density are removed away by a blasting process.

The expanded graphite particles which are on the side of the surface of the expanded graphite tape 2, and which are highly oriented at a high density are removed away by a micro-blasting process using particles which are smaller in diameter than the expanded graphite particles. Specifically, a blasting process is performed with using fine particles (for example, a particle diameter of 15 $\mu$m) of SiC or the like at an air pressure of 2 kg/cm$^2$ from a position which is separated by 150 mm from the outer face of the expanded graphite tape 2. When a microblasting process is performed in this way, expanded graphite particles in which cracks are easily caused and grown are removed away from the surface 5 of the expanded graphite tape 2, and the flaking resistance of the expanded graphite particles which has been in a range of 30 to 40 g before the blasting process can be increased to a range of 140 to 150 g.

FIGS. 7A to 7D show examples in which a blasting process is applied to the embodiments which have been described with reference to FIGS. 1 to 5. It is a matter of course that a blasting process may be applied to the embodiments of FIGS. 6A to 6D.

INDUSTRIAL APPLICABILITY

According to the invention, flaking of expanded graphite particles from one end portion of an expanded graphite tape during a braiding process can be reduced or prevented from occurring.

According to the invention, the tensile and twisting strengths of an expanded graphite tape are improved, and the braiding yarn can be subjected to braiding at a larger tensile force.

According to the invention, flaking of expanded graphite particles can be more surely reduced or prevented from occurring.

In a process of braiding a plurality of braiding yarns, therefore, a defect that a large tensile force cannot be applied to the braiding yarns and the tensile force of the braiding yarns is limited to a low level is eliminated, and braiding yarns can be braided at a larger tensile force, so that the pressure resistance of a gland packing can be enhanced.

What is claimed is:

1. A braiding yarn made of expanded graphite which is to be used in a gland packing, wherein an outer periphery of a bent expanded graphite tape is covered by a reinforcing member configured by a knitted body or a braided body, said expanded graphite tape having two end portions in a width direction of said expanded graphite tape which are bent to be directed toward an inner side in the width direction of said braiding yarn.

2. A braiding yarn made of expanded graphite which is to be used in a gland packing, wherein an outer periphery of a twisted expanded graphite tape is covered by a reinforcing member configured by a knitted body or a braided body, and at least one end portion in a width direction of said expanded graphite tape is bent to be directed toward an inner side in the width direction of said braiding yarn.

3. A braiding yarn made of expanded graphite according to claim 1, wherein reinforcing fibers are embedded in said expanded graphite tape.

4. A braiding yarn made of expanded graphite according to claim 2, wherein reinforcing fibers are embedded in said expanded graphite tape.

5. A braiding yarn made of expanded graphite according to claim 1, wherein part of expanded graphite particles on a side of a surface of said expanded graphite tape are removed away.

6. A braiding yarn made of expanded graphite according to claim 2, wherein part of expanded graphite particles on a side of a surface of said expanded graphite tape are removed away.

7. A braiding yarn made of expanded graphite which is to be used in a gland packing, wherein an outer periphery of a bent expanded graphite tape is covered by a reinforcing member configured by a knitted body or a braided body, and at least one end portion in a width direction of said expanded graphite tape is bent to be directed toward an inner side in the width direction of said braiding yarn, wherein reinforcing fibers are embedded in said expanded graphite tape, and wherein part of expanded graphite particles on a side of a surface of said expanded graphite tape are removed away.

* * * * *